Dec. 31, 1968 H. T. DINKELKAMP ET AL 3,419,695
FLOAT SWITCH ASSEMBLY
Filed March 23, 1966 Sheet 1 of 2
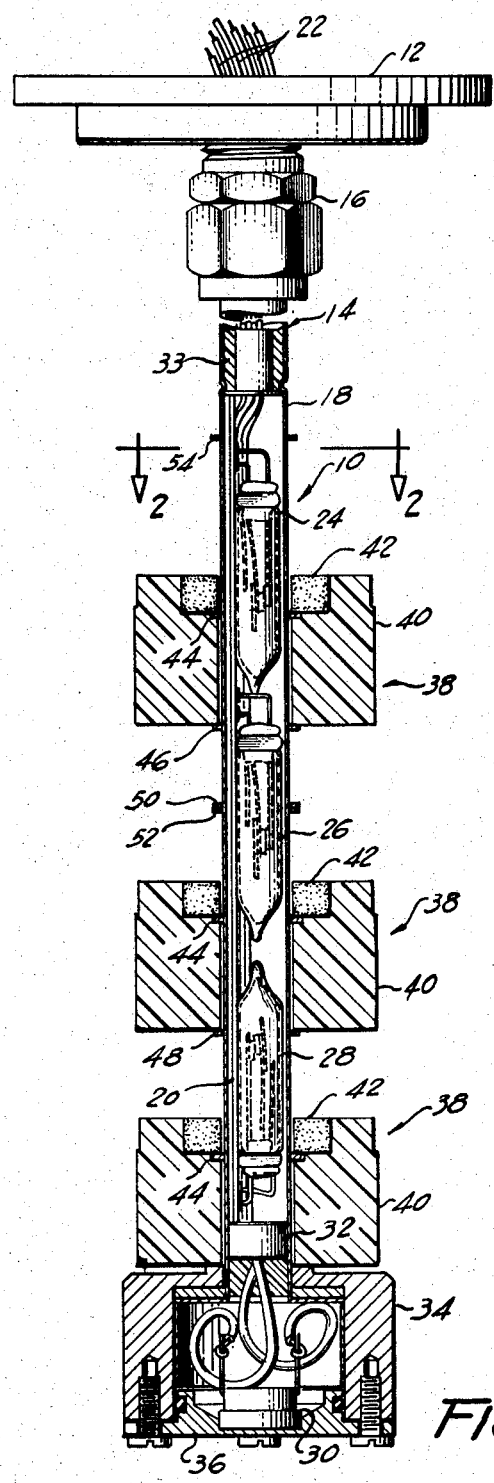
FIG. 1.
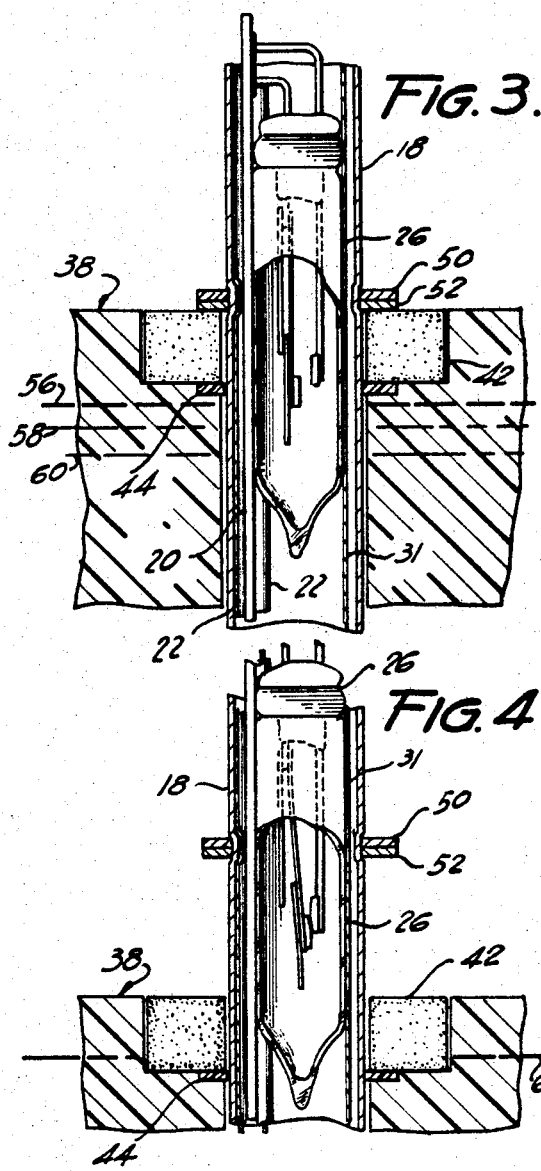
FIG. 3.
FIG. 4.
INVENTORS.
Henry T. Dinkelkamp
Marshall Miles.
By Norton Lesser
Attorney INVENTORS.
Henry T. Dinkelkamp
Marshall Miles.

By Norton Lesser.
Attorney

United States Patent Office 3,419,695
Patented Dec. 31, 1968

3,419,695
FLOAT SWITCH ASSEMBLY
Henry T. Dinkelkamp, Mount Prospect, and Marshall Miles, Wilmette, Ill., assignors to Stewart-Warner Corporation, Chicago, Ill., a corporation of Virginia
Filed Mar. 23, 1966, Ser. No. 536,708
3 Claims. (Cl. 200—84)

ABSTRACT OF THE DISCLOSURE

A thermostat and a plural switch arrangement located on an electrically insulated card positioned in a nonmagnetic tube for signalling respective levels of liquid in a reservoir. A float and magnet assembly are provided for each switch to control the respective switch in accordance with the liquid level, and a magnetic material is disposed in a predetermined position relative one of the switches. The magnetic material attracts and retains the respective magnet in the event the liquid carries the magnet into the vicinity of the magnetic material and prevents the magnet and float from falling under small or temporary liquid displacements to falsely operate the switch.

---

This invention relates in general to an improved float switch assembly for use in an oil mist reservoir and more particularly to an improved magnetically operated float switch.

Magnetically operated or controlled float switches present a number of inherent difficulties due to the turbulence or momentary displacement of the liquid in which the float and magnet are supported. Momentary displacement of the liquid causes the magnet to either close or open the switch without regard to the average liquid level. While a number of different techniques have been employed or preventing the float from responding to momentary alterations in liquid level, such techniques are generally expensive or ineffective.

It is, therefore, one object of the present invention to provide a simple, economical and effective arrangement for preventing operation of a float switch from momentary changes in liquid level.

It is another object of the present invention to provide a magnetically controlled float switch whose operation is delayed until the liquid level falls to a respective predetermined value.

It is another object of the present invention to provide a simple, economical means for adjusting the range in which a float switch is operated to indicate a corresponding liquid level.

Additional problems relate to the necessity for providing a universal system adapted for monitoring different desired oil levels, and the oil temperature in the reservoir of an oil mist system. This requires an efficient and economical assembly for locating a plurality of float switches to sense respective liquid levels and a thermostat to sense the temperature within the reservoir.

It is, therefore, another object of the present invention to provide an economical assembly of float switches and a thermostat for use in the oil reservoir of an oil mist system to permit monitoring of any one of a plurality of different oil levels and the oil temperature.

Other objects and features of the present invention will become apparent on examination of the following specification and claims wherein:

FIG. 1 is a side elevational view partially in section, disclosing an assembly of float switches and thermostat for use in the oil reservoir of an oil mist system;

FIG. 3 is an enlarged fragmentary sectional view illustrating the manner in which the float switch magnet is stabilized irrespective of momentary alterations in the liquid level;

FIG. 4 is an enlarged fragmentary sectional view illustrating the manner in which the float switch magnet responds to a substantial alteration in liquid level.

Figure 5:
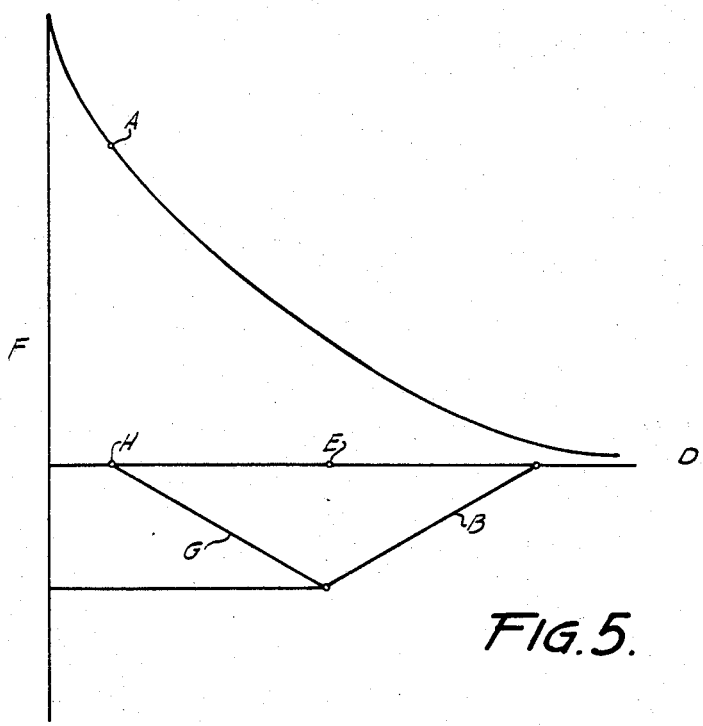
FIG. 5 is a graph showing the manner in which the attractive force of the magnet operates to stabilize the float.
Figure 2:
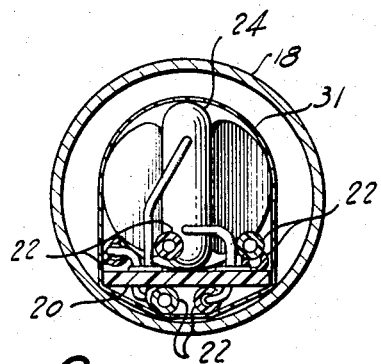
FIG. 2 is a sectional view taken through the line 2—2 in FIG. 1.

In FIG. 1 a float switch and thermostat assembly is indicated generally by the reference character 10. The assembly 10 comprises a top mounting plate 12 which is secured in appropriate opening in the oil reservoir of an oil mist system. A tube assembly 14 is secured to the plate 12 by means of a suitable threaded nipple 16.

The tube assembly 14 comprises a stainless steel tube 18 in which an elongate, flat, electrically insulating card 20 is disposed. A plurality of insulated leads or wires 22, one or more of which may serve as a ground connection, extend along the card 20 for connection to respective glass encapsulated conventional reed switches 24, 26 and 28 and a thermostat 30 located at the lower end of the tube assembly.

The reed switches 24, 26 and 28 are suspended or carried on the card 20 at respective spaced apart positions by means of rivets to which their terminals are soldered for connection to respective ones of leads 22. A tape 31 is wrapped about the card, switches and portions of the leads in tube 18 prior to their assembly in tube 18 to form a rigid assembly. The location of the switches permits any one to be selected for indicating a respective oil level in an oil mist system.

The bottom of tube 18 is closed by a plug 32 and an associated ring upon which the card 20 rests. This serves to position the card and switches. A stop 33 in the tube adjacent the upper end of the card holds the card and switches firmly in position.

A cup-shaped receptacle 34, having a collar defining a central opening, is positioned on tube 18 with the collar located on a flange of the plug 32 at the bottom of the tube 18. The thermostat 30 is carried on a sealed plate 36 fastened to the end of receptacle 34 to thereby form a single assembly with the switches. Leads to the thermostat 30 are extended through the plug 32. Suitable gaskets and/or sealing compounds seal the engaged surfaces to prevent leakage into the receptacle 34 and tube 18.

In addition, a float assembly 38 is provided for each switch 24, 26 and 28. Each float assembly comprises an annular float member 40 encircling tube 18 and carrying a permanent magnet 42 cemented in a recess of the float. A guide washer 44 is provided between the bottom of each magnet and the bottom wall of the respective recess for guiding the float assembly in its movement along the longitudinal axis of the tube 18 in response to changes in liquid level of the reservoir.

The lowermost positions of the assemblies 38 are determined as desired by the adjustable position of respective non-magnetic retaining rings 46 and 48 with the lower surface of the lowest float 40 resting on the collar of receptacle 34. An adjustably positioned non-magnetic C-ring 50, having a ring 52 of magnetic material in association with the lower surface of ring 50, determines the upper position of the center float 40 and an adjustable ring 54 determines the upper position of top float 40. The position of ring 48 may be used to determine the upper position of the lowest float 40.

The rings 46, 48, 50, 52 and 54 are easily positioned along tube 18 to facilely secure the desired range of movement of the respective float assemblies and enable the operative realtionship to the respective switches 24, 26 and 28 to be easily determined.

In many oil mist operations it is desirable to maintain the oil level adjacent the lower end of switch 26. In this case switch 26 is normally closed to operate an oil pump when the respective magnet 42 is at or somewhat above the level shown in FIG. 1. The pump supplies oil to the reservoir in turn raising the level of the respective magnet 42 until it opens switch 26 and terminates operation of the pump.

Switch 24 is held open by the associated magnet in the position shown in FIG. 1, however, in the event the oil level rises substantially the associated float assembly 40 rises towards ring 54. This permits switch 24 to close and signal an undesirably high oil level.

Switch 28 is open when the oil level is of sufficient height to raise the respective float assembly from the position shown in FIG. 1 towards ring 46 in accordance with the normal desired oil level. If the oil level should drop the float assembly 38 associated with switch 28 falls toward the position shown in FIG. 1, and the switch closes to operate an alarm, signalling this condition.

Since intermittent operation of the pump, in response to momentary changes in oil level, is undesirable, stabilization of switch 26 is provided, as will be explained by reference now to FIGS. 3, 4 and 5. When the liquid level reaches a height indicated at 56, which is sufficient to carry the magnet 42 of the center float assembly above the level at which it influences switch 26, the switch is opened as the case may be to terminate operation of the pump. At the same time magnet 42 is attracted and held by ring 52. If now the liquid level should momentarily fall, for example, to a level indicated at 58 or 60, the ring 52 holds the magnet 42 with sufficient force to overcome the decrease in liquid support to prevent the magnet and float from falling with the liquid level and inadvertently operating switch 26.

If, however, the liquid should fall to the level indicated at 62 in FIG. 4, the weight of the float assembly being unsupported, or largely unsupported, will, under the influence of firavity, overcome the magnetic attraction of ring 54. The float assembly then assumes its normal position relative the liquid and switch 26 closes to operate the pump.

The effect of ring 52 on the operation of switch 26 is seen in the graph shown in FIG. 5 wherein the attractive force between the magnet 42 and ring 52 is indicated along the ordinate F and the distance between the liquid and the ring 52 indicated along the abscissa D. The curve A illustrates the normal attractive force exerted by the magnet as it approaches the ring 52. This attractive force is counteracted by the normal weight of the magnet and float less the buoyancy supplied by the liquid. Since the weight of the magnet and float are normally balanced by the liquid, the weight of the magnet and float act against the attractive force only when the magnet and liquid approach sufficiently close to the ring for the magnet to be lifted from its normal buoyed position. As indicated by the curve B this counteracting force increases in a negative or downward direction as the magnet is lifted from the liquid, and approaches the ring 52, until the float is completely free of the liquid. At that time the full weight of the magnet and float counteract the attractive force of the magnet, after which the counteracting force remains constant as indicated by the horizontal portion of curve B to the left of point E.

Therefore, to the right of point E representing the liquid level range where it is desired to prevent operation of switch 26, the effective removal of a portion of the liquid support in response to a tendency of the magnet to lift counteracts any tendency of magnet 42 to rise independently of the liquid. The switch 26 therefore remains unoperated irrespective of minor alterations in liquid level.

As the liquid level rises past point E, switch 26 is fully operated while the counteracting force is balanced by the rising liquid level. The magnet is then fully attracted by the ring 52. The liquid level may rise past the magnet and then begin to fall.

The counteracting force exerted by gravity as the level falls is indicated by curve G with its initiation beginning at a liquid level H at which the effective buoyancy decreases. This point occurs at a level where the attractive force A is high. The magnet is therefore held irrespective of minor liquid fluctuations until the buoyancy force is substantially lessened which occurs when the liquid level D approaches point E as seen in FIG. 5. At point E the buoyancy is a minimum and the counteracting force a maximum. The magnet can therefore fall permitting switch 26 to restore. Thus, fluctuations in liquid level about certain values does not effect operation of switch 26.

The foregoing description pertains to an improved float switch and assembly whose inventive concepts are believed set forth in the accompanying claims.

What is claimed is:

1. A combination for use with a magnetically operable first switch having contacts positioned at a desired level in a liquid reservoir, the improvement comprising a magnetic material secured at a predetermined position relative said switch contacts and above said switch contacts, a first assembly having a magnet for operating said switch contacts and carried by said liquid for reciprocating movement relative said switch contacts and material in accordance with the level of said liquid to operate said switch contacts in one manner in response to the level of said liquid carrying said magnet adjacent said desired level and enabling said switch contacts to operate in another manner in response to said magnet being carried by said liquid adjacent the level of said predetermined position, with said magnet and float assembly being attracted and engaged by said magnetic material for retaining said magnet and float adjacent said predetermined position in the event said liquid rises to a level corresponding to said predetermined position for maintaining said switch contacts operated in said other manner and preventing subsequent movement of said float assembly until said liquid falls to a position wherein the unsupported weight of said magnet and float assembly exceeds the attractive force between said magnet and said material, a second switch arranged in vertical alignment with said first switch, a tube of nonmagnetic material encircling each of said switches, a second float assembly having a magnet for operating said second switch with each magnet encircling a portion of the exterior surface of said tube for operating the respective switch in response to said liquid moving past a respective level, and an adjustable stop ring for each float assembly to prevent movement of the respective float assembly past a desired position with one of said stop rings positioned to prevent one float assembly from moving below a selected level and for preventing the other float assembly from moving above said selected level.

2. In the combination claimed in claim 1, an electrical lead for each switch, an electrically insulating card in said tube carrying each of said switches and each of said leads, a thermostat carried adjacent the lower end of said tube for submersion in said liquid, an electrical lead for said thermostat carried by said card, and means for sealing the lower end of said tube against the entrance of liquid from said reservoir.

3. A combination comprising a tube of nonmagnetic material for positioning in a liquid carried in a reservoir, a magnetically operable switch having contacts positioned at a desired level in said tube, a magnetic material secured at a selected position on said tube above said switch contacts, and a float assembly carrying a magnet and floated in said liquid external to said tube for reciprocating movement along the axis of said tube and relative said switch and material for solely operating said switch contacts and for being attracted and engaged by said magnetic material above said desired level in response to said magnet and float being moved adjacent said selected position to cause said switch contacts to terminate operation with said magnet and float being retained only by the attractive force between said material and magnet in response to a fall in the liquid level in said reservoir until an alteration in the level of said liquid creates a buoyancy change on said float and magnet exceeding the attractive force between said magnet and said material whereby said magnet is positioned for operating said switch contacts.

References Cited

UNITED STATES PATENTS

| 2,300,300 | 10/1942 | Lund | 200—84 X |
| 2,439,753 | 4/1948 | Reavis | 200—84 |
| 2,449,054 | 9/1948 | Cantlin | 73—308 X |
| 3,163,731 | 12/1964 | Lyden | 200—84 |
| 3,246,517 | 4/1966 | Malkiewicz | 200—84 X |
| 2,527,115 | 10/1950 | Bosworth | 200—84 |

FOREIGN PATENTS

| 553,090 | 3/1942 | Great Britain. |
| 1,190,688 | 4/1965 | Germany. |
| 997,861 | 7/1965 | Great Britain. |

GEORGE HARRIS, *Primary Examiner.*

R. COHRS, *Assistant Examiner.*